July 8, 1947. K. McM. JONES 2,423,651
COMBINED SCREENING AND GRAVITY LIQUID SEPARATION APPARATUS
Filed March 26, 1945 2 Sheets-Sheet 1
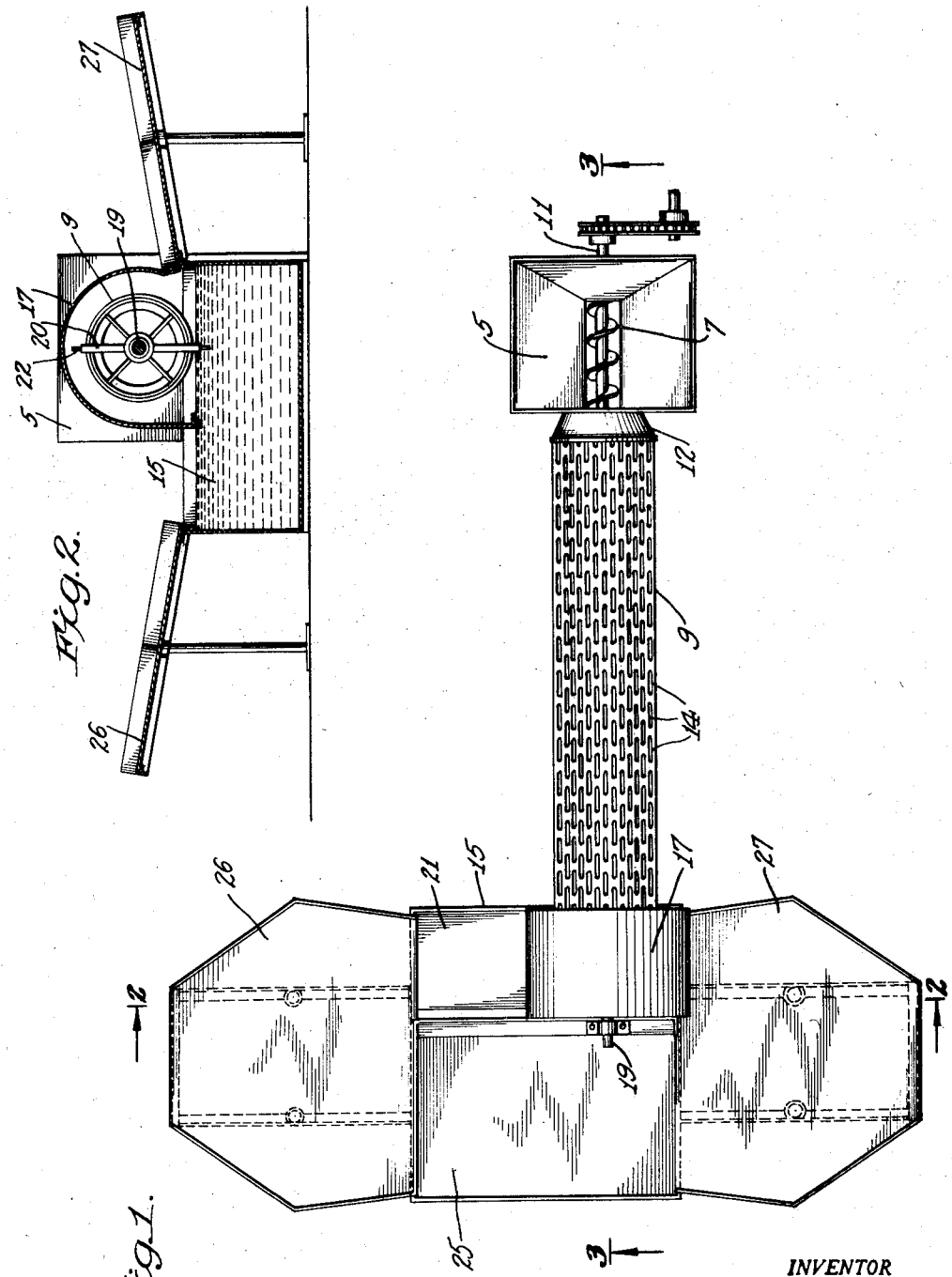
INVENTOR
KARL McM. JONES, DECEASED
ELIZABETH T. JONES, ADMINISTRATRIX
BY
Frederick Griswold, Jr.
ATTORNEY

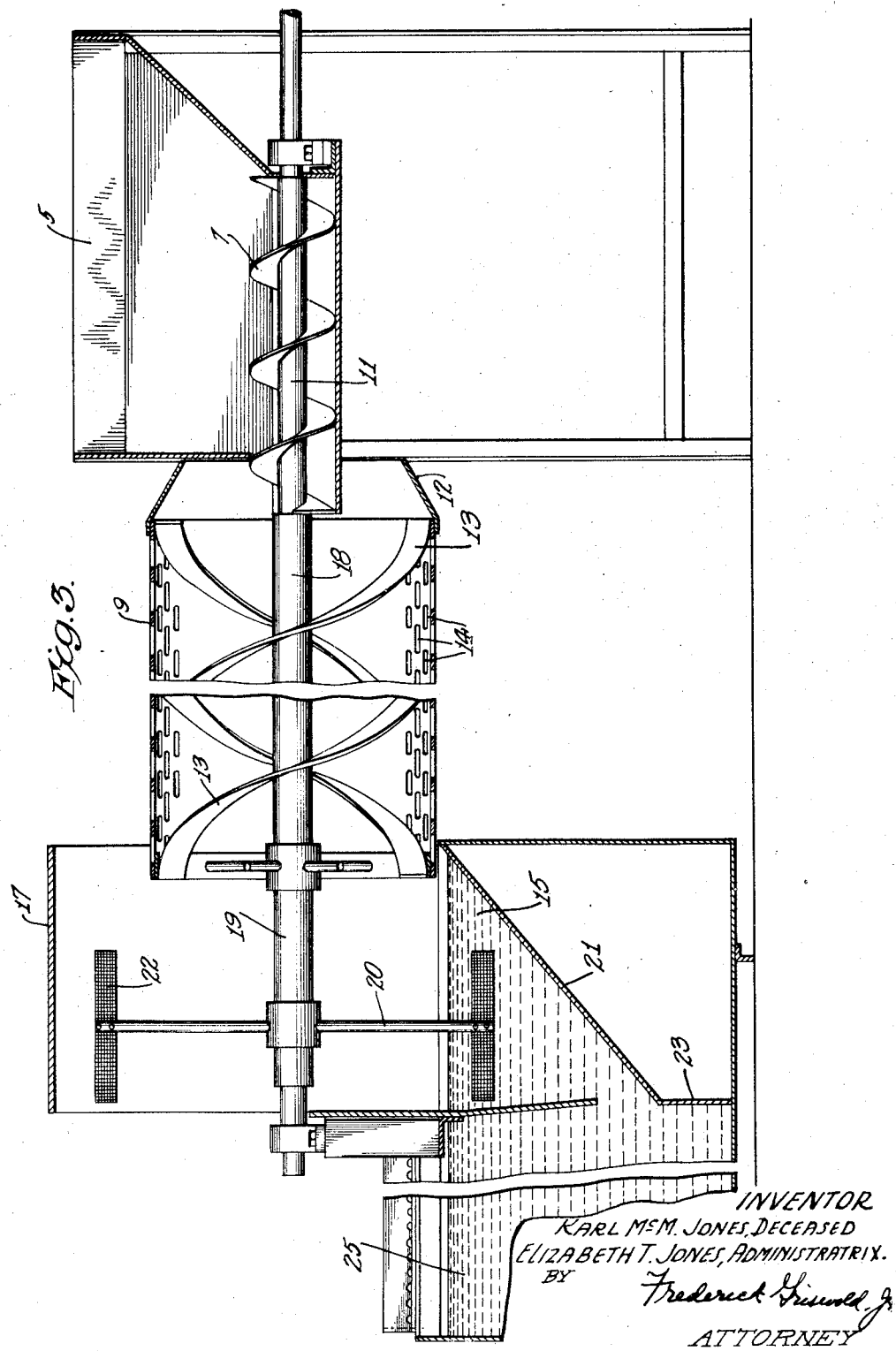

Patented July 8, 1947

2,423,651

UNITED STATES PATENT OFFICE 2,423,651

COMBINED SCREENING AND GRAVITY LIQUID SEPARATION APPARATUS

Karl McMaster Jones, deceased, late of Garrison, N. Y., by Elizabeth T. Jones, administratrix, Garrison, N. Y.

Application March 26, 1945, Serial No. 584,866

1 Claim. (Cl. 209—17)

This invention is directed to apparatus for separately recovering the kernels, shell and husk of cracked palm nuts. The apparatus described herein is particularly useful in connection with the treatment of nuts of the cohune variety, although not so limited.

In the copending application, Ser. No. 584,865, filed on even date herewith, there is disclosed a method of and apparatus for dehusking and cracking at least certain varieties of palm nuts, such as nuts of the cohune variety, and to effect initial separation of the husk and shell from the meat.

Partial recovery of separate kernels from the shell and husk is accomplished in a preliminary step such, for instance, as that shown in the copending application, although it is to be understood that any method of separating the shells and the meat as well as husk particles of the cracked nuts is within the purview of the invention.

Among the nuts to which this invention may be applied, and particularly such as have extremely hard and difficult to break shells, are those known as cohune or cahone, babassu, corozo and coquito. In addition to these, there are certain sub-varieties of the general classes just mentioned and also other nuts having local names, depending upon the region in which they grow. These include coyol, cokerite or cocorito, as well as manaca and others. Herein, these nuts are referred to generically as palm nuts. The various species of nuts listed above vary in length from about one inch to three or four inches or even slightly more. Many of these nuts have a single pocket and a single kernel therein, while others, as for example the babassu, have from three to seven kernels separated by membranes extending across the nut from one wall to another so that there are in effect several small pockets in the shell. Because of these varying structures, it has not been practical heretofore to use any specific type of mechanism for separating the shells from the kernels and to separately recover shell, kernel and husk and fragments thereof.

Heretofore, various methods, including a step of screening, have been proposed in order to accomplish the separation of husk, nut and shell fragments, but such screening operations have involved not only a train of screening instrumentalities whereby shell fragments and kernels or kernel fragments were recovered at different stages, but it was never possible to finally separate all of the kernels and shells or shell fragments into two wholly separated groups. The primary object of the present invention is, therefore, a shell and kernel separating instrumentality, as a secondary stage, in a screening process wherein the larger shell fragments have been previously separately recovered.

These and other objects of the invention and the means for their attainment will be more apparent from the following detailed description, taken in connection with the accompanying drawings illustrating one embodiment by which the invention may be realized, and in which:

Fig. 1 is a plan view of apparatus receiving a mixture of kernels and kernel fragments and shell and husk fragments and fiber from a preceding screening operation and further screening the materials so received and delivering the same to an instrumentality which separates the shells from the kernels by a flotation process;

Fig. 2 is a transverse sectional view taken in the plane indicated by the line 2—2 of Fig. 1 and looking in the direction of the arrows; and Fig. 3 is a view on an enlarged scale of the apparatus shown in Fig. 1, taken in the plane indicated by the line 3—3 of Fig. 1 and looking in the direction of the arrows.

Referring first to Fig. 1, there is shown at the right-hand end of that figure, a hopper 5 provided with a screw conveyor 7 in its lowermost portion delivering kernels, kernel fragments, shell fragments, husk, husk fiber and fines from the hopper to a rotating conveyor screen 9 by means of which separation of fragments, fines, fibers, and flour is accomplished. The screen 9 is fixed to the shaft 11 of the screw conveyor so as to rotate therewith, whereby the conveyor and the screen turn at the same speed and overloading is avoided. At its end proximate the hopper, the screen is provided with a frusto-conical shield 12 avoiding escape of material at this point. The screen is provided with a plurality of elongated longitudinally extending slots 14 of a width fine enough that shell fragments, fines, fiber and flour may fall therethrough, but of such dimensions as to prevent whole kernels or kernel fragments from falling through the screen. The kernels and larger shell and husk fragments thus travel through the screen by reason of the helical conveyor 13 (Fig. 3) therewithin and are delivered out of the end of the screen into the flotation tank 15 shown at the left in Fig. 3. This tank is filled with a liquid of predetermined density, preferably water, to which a sufficient amount of a salt is added to attain the density required. The outlet end of the screen 9 terminates at one side of the tank 15 and within a semi-cylindrical housing 17 into which an extension of the shaft 18 of the screen extends, as at 19. The shaft extension 19 carries diametrically disposed arms 20 having at their ends screen-like paddles 22 to agitate the liquid. The tank 15 is formed with a downwardly inclined wall 21, which terminates in a vertical wall 23 forming an edge over which shell travelling down the wall 21 will fall. This prevents shell backing up on the inclined wall and facilitates recovery. A baffle 24 located opposite the discharge end of said screen and projecting into said tank is inclined slightly inwardly and terminates above the end of the inclined wall portion 21, so that heavier particles falling into the tank, in this instance shell, will sink in the liquid and fall upon the inclined wall 21 and flow down this inclined wall and over the lower end thereof and into the end tank portion 25 for separate recovery. The kernel fragments are sometimes entrapped with the shell and would then be carried down with the shell. However, the paddle means, consisting preferably of the pair of diametrically disposed arms 20 provided at their respective ends with elongated sections of relatively rigid screens 22, rotates in the upper portion of the tank for the purpose of agitating the mixture of kernels and shell fragments to thereby separate the kernels from the shell fragments and permit the shell fragments to sink down onto the inclined wall 21 from which they pass into the end tank 25 for recovery. The lighter kernel and husk fragments float on the top of the liquid in the tank. By this agitation, it causes the water to flow toward the drain board 27, carrying with it the kernels and husk, to a position from which they may be withdrawn onto the drain board. This portion of the tank is separated laterally from a remaining portion of that end of the tank by the baffle 24, so that the kernels and husk fragments can be drawn onto the drain board 27 at that side. Thus the kernels and husk fragments, which have been largely freed of smaller fragments in the cylindrical screen, are subjected to subsequent final separation by air float separator means. The shells are removed from the bottom of the tank to the drain board 26 on the opposite side, the liquid running back down the drain board into the tank.

It will thus be seen that the shell and kernel are separately recovered with minimum effort and labor.

Various modifications will occur to those skilled in the art in the type of screen provided as well as the method of transferring the cracked nuts from the hopper to the flotation tank, the instrumentalities utilized to free the heavier nuts from the lighter shells for separate recovery, as well as the form taken by the flotation tank, and no limitation is intended by the phraseology of the foregoing description or illustrations in the accompanying drawings except as indicated in the appended claim.

What is claimed is:

Apparatus for separating the kernels, shells and husk fragments of cracked nuts, comprising a hopper into which said cracked nuts may be introduced, a rotatable shaft extending through and beyond said hopper, a screw conveyor rigidly secured to and carried by said shaft and located in the bottom of said hopper, a perforated cylindrical screen also rigidly secured to and carried by and rotating with said shaft and provided internally with helical conveyor means, which screen receives at one end the cracked nuts supplied from said hopper by said screw conveyor and discharges at the other end the residue of the screening operation, a water-containing tank having an inclined wall located below and arranged to receive nut kernels, husk and shell fragments from the discharge end of said screen, a baffle located opposite the discharge end of said screen and projected into said tank, and paddle means also rigidly secured to and carried by said shaft and located between said baffle and the discharge end of said screen and arranged to agitate the mixture of kernels, husks and shells at the surface of the water in the tank whereby the shells which are separated from the kernels and husks are permitted to sink in the water on to the inclined wall of the tank down which they slide beneath the baffle into the bottom of the tank.

ELIZABETH T. JONES,
*Administratrix of the Estate of Karl McMaster Jones, Deceased.*

REFERENCES CITED

The following references are of record in the file of this patent:

UNITED STATES PATENTS

| Number | Name | Date |
|---|---|---|
| 1,757,103 | Voigt | May 6, 1930 |
| 1,866,965 | Clement | July 12, 1932 |
| 2,073,095 | Carter | Mar. 9, 1937 |
| 612,744 | Methven | Oct. 18, 1898 |
| 1,350,973 | Jeffries | Aug. 24, 1920 |
| 1,143,202 | Keene | June 15, 1915 |
| 1,007,119 | Lee | Oct. 31, 1911 |
| 1,523,739 | Vodicka | June 20, 1925 |
| 1,374,657 | Hilder | Apr. 12, 1921 |
| 2,237,442 | MacFarlane | Apr. 8, 1941 |

FOREIGN PATENTS

| Number | Country | Date |
|---|---|---|
| 2,741 | Great Britain | 1870 |